Jan. 21, 1958     W. A. RAY     2,820,604
VALVE WITH ADJUSTABLE OPENING
Original Filed Feb. 14, 1949
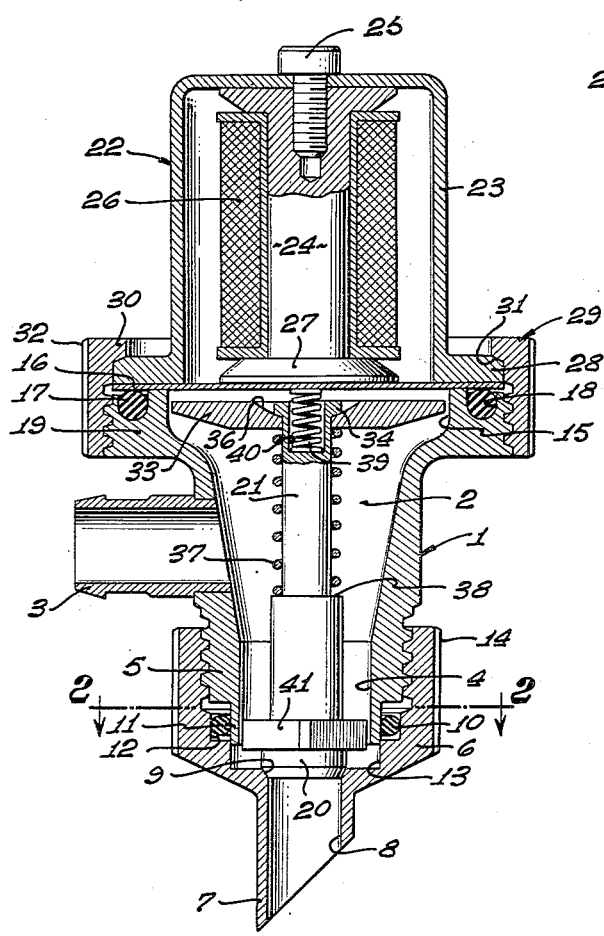
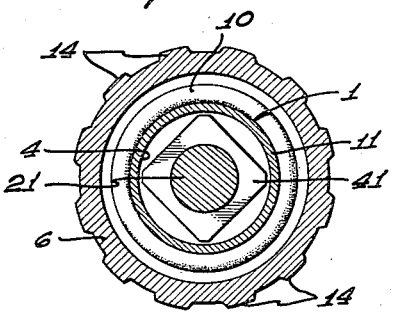
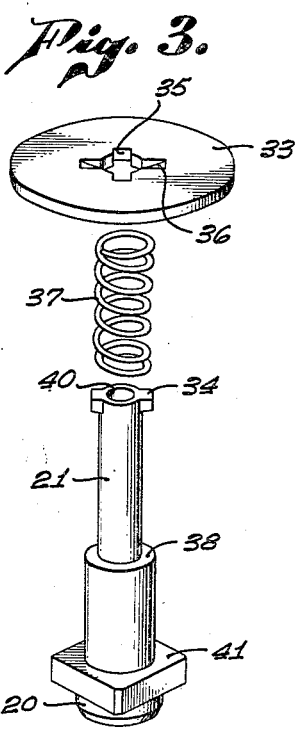
INVENTOR.
WILLIAM A. RAY,
BY
Flam and Flam
ATTORNEYS.

United States Patent Office 2,820,604
Patented Jan. 21, 1958

2,820,604
VALVE WITH ADJUSTABLE OPENING

William A. Ray, North Hollywood, Calif., assignor to General Controls Co., a corporation of California Original application February 14, 1949, Serial No. 76,388, now Patent No. 2,697,581, dated December 21, 1954. Divided and this application April 12, 1954, Serial No. 422,507

1 Claim. (Cl. 251—129)

This invention relates to valves, and particularly to sanitary valves for dispensing liquids, such as cream, coffee, or the like.

This application is a division of an application filed February 14, 1949, in the name of William A. Ray, entitled Electro-Magnetically Operated Valve With Adjustable Opening, now Patent No. 2,697,581, issued December 21, 1954.

Automatic dispensing of coffee, or other drinks having several ingredients, may be accomplished by aid of electrically operated valves. A control circuit for the valves is usually provided, said circuit having a timer for metering the ingredients. To obtain the desired proportions, the valves must be arranged either to shut off after the proper intervals, or the rates of discharge must be properly adjusted.

It is one of the objects of this invention to provide a simple and effective valve structure that fulfills these requirements.

It is another object of this invention to provide a sanitary valve structure that may be readily taken apart for such frequent cleaning as the nature of the liquids being dispensed requires.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claim.

Referring to the drawings:

Figure 1 is a longitudinal section of a valve incorporating the invention;

Fig. 2 is a sectional view, taken along a plane corresponding to line 2—2 of Fig. 1; and Fig. 3 is an exploded view of some of the valve elements.

An electromagnetically operated valve is shown that includes a hollow body 1 of generally circular configuration. A generally circular valve chamber 2 is formed in the body. The body 1 has an inlet connection 3 for the chamber 2 which may be appropriately fastened to one side of the body 1, and which may be formed so as to provide a hose coupling, or the like.

The valve body 1 has a lower cylindrical opening 4 formed by a reduced extension 5 of the body. Threaded over this extension 5 is a spout-forming member 6 having an integrally formed spout 7 provided with an opening 8 axially aligned with the body opening 4. The spout 7 may be formed to accommodate a coupling or connection.

The upper edge of the spout opening 8 forms a tapered or frusto-conical valve seat 9 through which the liquid from the valve chamber 2 may pass.

Sealing is effected between the member 6 and the body 1 by the interposition of a sealing O-ring 10. This sealing ring is accommodated in an annular space between a reduced cylindrical extremity 11 of the extension 5 and an inner cylindrical surface 12 formed below the threads of the member 6. The extremity 11 slidingly interfits an annular wall 13 of the member 6 located inwardly of and longitudinally spaced from the cylindrical surface 12.

The member 6 may furthermore be provided with serrations 14 to facilitate the manual operation of adjusting the position of the spout 7 with respect to the body for purposes to be hereinafter more fully described.

The valve body 1 has an upper enlarged opening 15 over which a flexible diaphragm 16 extends. A resilient O-ring 17 establishes a seal between the diaphragm 16 and the body 1. The ring 17 extends in a shallow annular groove 18 formed in a flange 19 at the upper end of the body. The ring 17 engages the marginal portions of the diaphragm 16 extending beyond the upper body opening 15. Firm interengagement between the diaphragm 16 and the ring 17 is provided in a manner to be hereinafter more fully described.

A valve closure 20, formed integrally at one end of a stem 21, is engageable with the seat 9 for controlling the flow of fluid through the valve. The closure 20 is movable away from the seat to open the valve.

For this purpose, an electromagnet structure 22 is provided. The electromagnet 22 includes a cup-like shell 23, a central core member 24 detachably connected to the shell by the aid of a machine screw 25, and an electromagnet coil 26 mounted upon the core 24.

The core 24 has an enlarged pole piece 27 contacting the diaphragm 16 on the outside of the valve chamber 2.

The shell has an outwardly extending flange 28 overlying the marginal portion of the diaphragm 16.

In order to provide a readily detachable fastening means for the electromagnet 22 and for clamping the diaphragm 16 against the ring 17, use is made of an internally square threaded ring or nut 29. The nut 29 is engageable with corresponding threads on the exterior surface of the body flange 19. The nut 29 is large enough in diameter to be passed completely over the shell 23 and thereby engage the threads of the body 1. The nut 29 has an inwardly extending flange 30 that has a sloping surface 31 adapted to engage a corresponding sloping surface at the upper edge of the shell flange 16. The exterior surface of the nut 29 may be serrated, as indicated at 32.

By the aid of this arrangement, it is a simple matter to remove the nut 29 and to remove the electromagnet 22 from the body 1.

The electromagnet 22 serves as a means to lift the closure 20 from its seat 9. For this purpose, a disc-shaped armature 33 is carried at the upper end of the stem 21. The armature 33 is detachably carried on the stem by the aid of diametrically oppositely extending keys or extensions 34. Keyholes 35, formed in the center of the armature 33, when aligned with the keys 34 permit the armature 33 to be passed over the end of the stem 21. After the keys 34 have passed beyond the keyholes 35, the armature 33 may be turned to move the keys 34 out of alignment with the keyholes 35 to prevent removal of the armature 33. Slots or grooves 36 disposed in the upper face of the armature 33 provide seats for the keys 34. The seats prevent relative rotation between the armature 33 and the stem 21, ensuring against inadvertent alignment of the key projections 34 with the keyholes.

Also, the grooves 36 are of a depth sufficient to locate the keys at or beneath the upper surface of the armature, whereby the upper armature surface may be moved to engage the diaphragm 16.

In order to maintain the key projections 34 within the slots 36 against axial separation, use is made of a compression spring 37 which surrounds the stem 21. Its upper end abuts the lower surface of the armature 33, while its lower end contacts a shoulder 38 formed by an enlarged lower portion of the stem 21. The armature 33 is thereby securely connected to the stem 21 for movement of the closure 20 in accordance with the movement of the armature 33.

When the electromagnet 22 is energized, the disc armature 33 is attracted and moved against the diaphragm 16 forming a stop limiting opening movement of the valve stem 21.

The armature 33 extends substantially entirely across the upper opening 15 of the body 1, the upper opening 15 serving as a guide for the armature 33. The body opening 15 is of a size slightly greater than the size of the lower opening of the shell 23. The inner portion of the shell flange 28 inwardly overhangs the body opening 15 and extends the plane of the surface of the enlarged pole piece 27. The flange 28 forms an annular polar area cooperable with the marginal portions of the armature 33. The central portion of the armature 33 is cooperable with the polar area formed by the pole piece 27 of the core 24.

When the electromagnet 22 is de-energized, the stem 21 is urged downwardly by the aid of a light compression spring 39. The compression spring 39 is located in a recess 40 in the upper end of the stem 21. The upper end of the spring contacts the lower face of the diaphragm 16.

The lower end of the stem 21 is provided with a generally square flange 41, the diagonal of which is slightly less than the diameter of the lower opening 4 of the body. It is assured in this manner that the axis of the stem 21 will not be too greatly misaligned with respect to the axis of the seat 9. Fluid may pass between the segments defined by the clearance between the square flange 41 and the lower body opening 4.

The rate of flow of fluid through the valve is proportional to the extent of travel of the closure 20 from the seat 9. Hence, the rate of flow through the valve is determined by the spacing between the seat 9 and the diaphragm 16. The position of the spout-forming member 6 is adjusted in order to vary this spacing. This is accomplished by rotating the spout-forming member 6 with respect to the body 1 to advance or retract it. The O-ring 12 ensures against leakage of the valve about the spout for all adjusted positions. Furthermore, since the spout 7 is formed integrally with the member 6, and since the upper edge of the opening 8 forms the valve seat 9, complete discharge of liquid through the spout is assured without drooling or dripping.

The valve is easily disassembled. The nut 29 is unfastened and the electromagnet 22 removed; the diaphragm 16 can then be lifted; and the valve closure assembly may be lifted through the upper body opening 15. The spout-forming member 6 is easily unfastened. Cleaning of the valve, such as may be desirable in connection with potable liquids, is easily and quickly accomplished.

The inventor claims:

In a valve structure: a valve body having coaxial openings at opposite ends; said body having a cylindrical surface adjoining each of the body openings; a diaphragm covering one of the openings; a spout member having a discharge passage; means adjustably mounting the spout member on the body for movement substantially axially of the other body opening; the discharge passage registering with said other body opening; means forming a valve seat about the discharge passage, the valve seat being substantially aligned with said other body opening; a closure in the body engageable with the seat; an armature carried by the closure at that end thereof remote from said seat and engageable with the diaphragm; engagement of said armature with said diaphragm determining a limited position of the closure in the body; the length between the engaging surface of the armature and the engaging portion of the closure being fixed; resilient means interposed between the diaphragm and the closure for normally moving the closure into engagement with the seat and for normally moving the armature away from said diaphragm; said closure having a non-circular flange adjacent its seat engaging portion in guiding relationship with the cylindrical surface adjoining said other body opening and the periphery of said armature being in guiding relationship with the surface adjoining said one body opening for confining movement of said closure and said armature for movement in a direction normal to said diaphragm and normal to said seat; and an electromagnet mounted exteriorly of the body at the diaphragm for moving said closure.

References Cited in the file of this patent

UNITED STATES PATENTS

| | | |
|---|---|---|
| 1,185,970 | Bower | June 6, 1916 |
| 1,970,546 | Clapper | Aug. 21, 1934 |
| 1,999,221 | Walker | Apr. 30, 1935 |
| 2,195,764 | Brauer | Apr. 2, 1940 |
| 2,272,115 | Halkyard | Feb. 3, 1942 |
| 2,331,503 | Ray | Oct. 12, 1943 |
| 2,640,726 | Prescott | June 2, 1953 |
| 2,676,037 | Mueller | Apr. 20, 1954 |